United States Patent
Oki

Patent Number: 5,982,391
Date of Patent: *Nov. 9, 1999

[54] DRAWING TIME ESTIMATION IN IMAGE PROCESSING INCLUDING DATA COMPRESSION/DECOMPRESSION

[75] Inventor: Joji Oki, Yokohama, Japan

[73] Assignee: Canon Kabushiki Kaisha, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/604,578

[22] Filed: Feb. 21, 1996

[30] Foreign Application Priority Data

Feb. 24, 1995 [JP] Japan ................................. 7-036805

[51] Int. Cl.⁶ .................................................. G06F 15/00
[52] U.S. Cl. ......................... 345/501; 345/509; 345/202; 395/115
[58] Field of Search .................................... 395/167–172, 395/501, 101, 102, 109, 110, 112, 114–117; 345/501, 507, 509, 192–195, 202; 358/501, 401, 404, 426, 443, 448, 450, 462, 470

[56] References Cited

U.S. PATENT DOCUMENTS

| | | |
|---|---|---|
| 5,129,049 | 7/1992 | Cuzzo et al. ............................. 395/113 |
| 5,150,454 | 9/1992 | Wood et al. ............................. 395/114 |
| 5,444,827 | 8/1995 | Biggs et al. ............................. 395/115 |
| 5,500,928 | 3/1996 | Cook et al. ............................. 345/433 |
| 5,515,481 | 5/1996 | Pardo ....................................... 395/117 |
| 5,524,186 | 6/1996 | Campbell ................................. 395/115 |
| 5,602,976 | 2/1997 | Cooper et al. ........................... 395/116 |
| 5,638,498 | 6/1997 | Tyler et al. .............................. 395/117 |
| 5,680,521 | 10/1997 | Pardo et al. ............................ 395/112 |
| 5,835,122 | 11/1998 | Oki et al. ................................ 347/251 |
| 5,850,504 | 12/1998 | Coope et al. ............................ 395/117 |

*Primary Examiner*—U. Chauhan
*Attorney, Agent, or Firm*—Fitzpatrick, Cella, Harper & Scinto

[57] ABSTRACT

According to the present invention, provided are a list generator for generating, upon receipt of a printer command from a host computer, a display list that serves as intermediate code that printers use in common, a storage section for storing, in advance, an estimated drawing time for each object, which is required for drawing a raster image of the display list, a determination section for ascertaining, before drawing of the raster image for each band width is begun, whether or not an estimated drawing time for the display list is stored in the storage section, and a controller for calculating a drawing time by the addition of the estimated drawing time for the display list when the determination section ascertains that the estimated drawing time is stored, and for performing a predetermined calculation to acquire a drawing time that is required for developing the display list into a raster image when the determination section ascertains that the estimated drawing time is not stored.

45 Claims, 5 Drawing Sheets

DRAWING TIME ESTIMATION IN IMAGE PROCESSING INCLUDING DATA COMPRESSION/DECOMPRESSION

BACKGROUND OF THE INVENTION

1. Field of the Invention

The present invention relates to an image processing apparatus, which converts a printer command input by a host computer into intermediate code (a display list) that is specifically for printers, and which develops the intermediate code into a bit map for each specific band or for each page; to a drawing processing method therefor; and to a memory medium, in which is stored a drawing processing program.

2. Related Background Art

Conventionally, when the time that is required for the development of a bit map by such a printing device is to be calculated, a printer command that is input by a host computer is converted into intermediate code (a display list) that is specifically for printers, and the time for drawing the display list in a raster memory is calculated before the list is physically drawn in the raster memory.

The printing device comprises a display list storage section for managing and storing, for each band, a display list for at least one page; a band drawing section for drawing the display list for each band; a band raster storage section for storing the band rasters that are drawn; and a drawing time control section for managing, for each band, a time for drawing the display list in the band raster. The time for drawing, for each band, a display list in the band raster is compared with a specified time, and when the drawing time is shorter than the specified time, the band raster is output for each band. When the drawing time is longer than the specified time, the display list storage section and a system work memory are employed as band rasters to acquire the band raster for one page, the raster for one page is generated and is output.

In the above prior art, however, time T for drawing characters from the display list to the band raster, for example, is calculated by expression (1), below, wherein the width of a character is denoted by wd and the height of a character is denoted by ht:

$$T = a + b \cdot wd + c \cdot ht \qquad (1)$$

(a, b and c are constants)

For compressed characters, drawing time T is roughly calculated by expression (2), wherein the width of a decompressed character is denoted by wd, the height of a decompressed character is denoted by ht, and the size of compressed data is denoted by S1:

$$a + b \cdot wd + c \cdot ht + d/S1 \qquad (2)$$

(a, b, c and d are constants)

Therefore, it takes much time to calculate the drawing time, and especially for compressed data (when the contents of compressed data are analyzed and the number of monochrome inversions is acquired to calculate the exact data decompression time), an error in the drawing time calculation is large.

SUMMARY OF THE INVENTION

To resolve the above described shortcoming, it is one object of the present invention to provide an image processing apparatus that stores, in advance, an estimated drawing time for each object, which is required for drawing a display list, and calculates a drawing time by fetching the stored estimated drawing time, so that the estimated drawing time necessary for a display list can be acquired more easily and in a shorter time period than in a conventional case and so that the estimated drawing time relative to a compressed target for drawing can be introduced with a smaller error than in the conventional case; and to provide a drawing method, for such an image processing apparatus, and a memory medium in which the drawing program is stored.

To achieve the above object, according to one aspect of the present invention, an image processing apparatus comprises: list generation means for generating, upon receipt of a printer command from a host computer, a display list, which serves as intermediate code that printers use in common; storage means for storing, in advance, an estimated drawing time for each object, which is required for drawing a raster image of the display list; and calculation means for calculating drawing time by the addition of the estimated drawing time for the display list.

According to another aspect of the present invention, an image processing apparatus comprises: list generation means for generating, upon receipt of a printer command from a host computer, a display list that serves as intermediate code that printers use in common; storage means for storing, in advance for each object, an estimated drawing time that is required for drawing a raster image of the display list; and determination means for ascertaining, before drawing of the raster image for each band width is begun, whether or not an estimated drawing time for the display list is stored in the storage means; and control means for calculating a drawing time by the addition of the estimated drawing time for the display list when the determination means ascertains that the estimated drawing time is stored, and for performing a predetermined calculation to acquire a drawing time that is required for developing the display list into a raster image when the determination means ascertains that the estimated drawing time is not stored.

DETAILED DESCRIPTION OF THE PREFERRED EMBODIMENTS

[First Embodiment]

Figure 1:
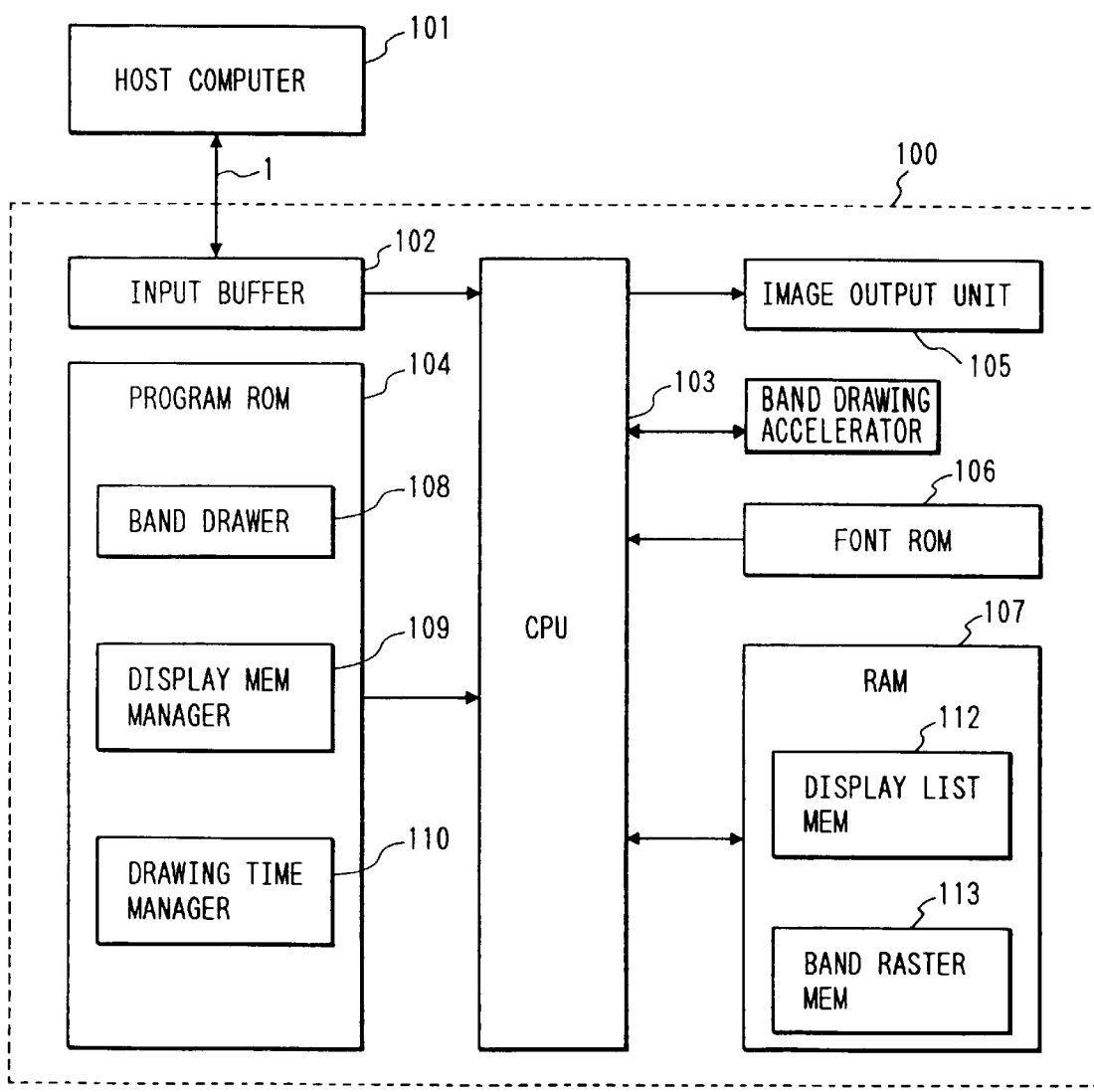
FIG. 1 is a block diagram for explaining the arrangement of an image processing apparatus according to a first embodiment of the present invention.

FIG. 1 is a block diagram for explaining the arrangement of an image processing apparatus according to a first embodiment of the present invention.

A host computer 101 communicates with a control unit 100 via a bidirectional interface 1. The control unit 100 is so designed that it receives commands and data from the host computer 101 and prints them. A CPU 103 performs the arithmetic operations that are required for the control of an engine (not shown). An input buffer 102 temporarily holds commands and data sent from the host computer 101. A program ROM 104 is employed to store programs, etc., that are executed to perform the control sequences listed in the flowcharts in FIGS. 2 and 6, which will be described later.

A font ROM 106 is employed to store character font data for an outline font and the estimated drawing time required for the development of each outline font into a bit map. A RAM 107 serves as a work area for the CPU 103 for the execution of each program; as a display list (intermediate data) memory 112; and as a band raster (image data) memory 113. An image output unit 105 outputs image data to a printer engine.

When a printer command that is input by the host computer 101 is converted into intermediate data (a display list) that is specifically for printers, an estimated drawing time for each font, which is stored in advance in the font ROM 106, is also registered in the display list in the display list memory 112.

Power is supplied by a power source (not shown) to the control unit 100. In the program ROM 104 are stored three programs: a band drawer 108, a display memory manager 109, and a drawing time manager 110.

Figure 2:
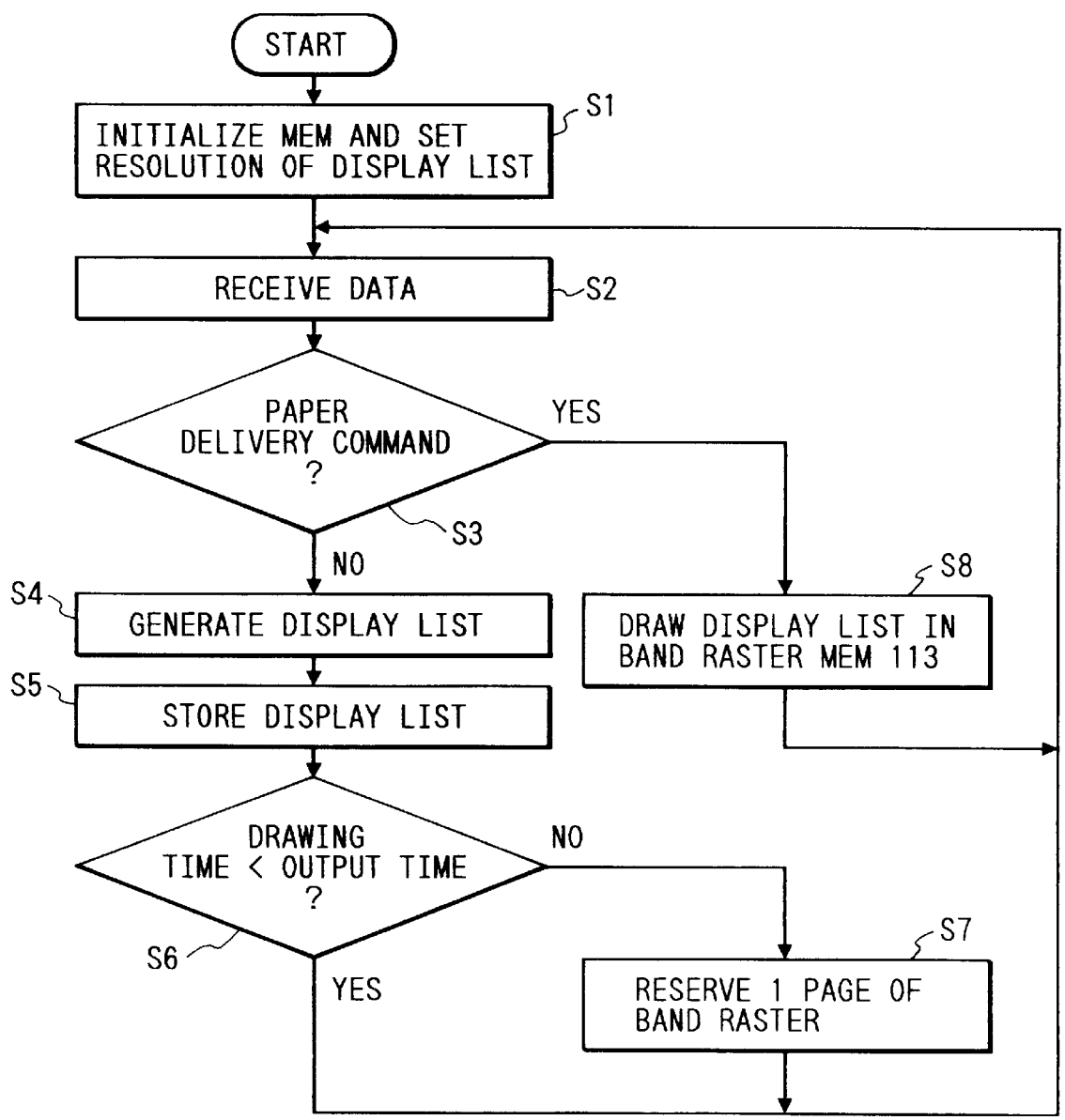
FIG. 2 is a flowchart showing one example of a drawing process employed for a RAM in FIG. 1.

FIG. 2 is a flowchart showing one example program for the drawing processing that utilizes the RAM 107 shown in FIG. 1. The labels S1 through S8 identify the individual processing steps.

When the main body is powered on, the CPU 103 initializes the display list memory 112 and the band raster memory 113, and sets a resolution for a display list, which will be generated at step S4 (step S1). The structure of the display list memory 112 will be described later.

Then, the CPU 103 receives data from the host computer 101 (step S2), stores it in the input buffer (RAM) 102, and reads data for one code unit from the input buffer 102. The CPU 103 determines whether or not the received data is a paper delivery command (step S3). When the received data is not a paper delivery command, a display list is generated based on the command (step S4). The display memory manager 109 acquires a memory area in the display list memory 112, and the generated display list is stored in the memory area.

Following this, the drawing time manager 110 estimates the time that is required for drawing the generated display list in the band raster memory 113, and adds the estimated time to a band management table. The CPU 103 determines whether or not the time for drawing the display list in the band raster memory 113 is shorter than the time for outputting data from the band raster memory 113 to the image output unit 105 (step S6). If the result is YES, program control returns to step S2, whereat the subsequent data input is waited for.

When it is determined at step S6 that the drawing time that is added to the band management table is equal to or greater than the time that is required for outputting data from the band raster memory 113 to the image output unit 105, program control advances to step S7, whereat the CPU 103 saves an empty area in the display list memory 112, or one part of the system work memory, as a band raster for one page. Program control thereafter returns to step S2, whereat the subsequent data input is waited for.

If, at step S3, the command is determined to be a paper delivery command, the CPU 103 draws the display list for each band in the band raster memory 113 (step S8). The band raster (image data) for which drawing is completed is transmitted to the printer engine by the image output unit 105.

When the drawing time that is added is determined at step S6 to be equal to or greater than the output time from the band raster memory 113 to the image output unit 105, at step 58 the CPU 103 draws the display list in a band area for one page, and the drawing result is transmitted to the engine.

When the drawing time that is added is determined at step S6 to be smaller than the output time from the band raster memory 113 to the image output unit 105, at step S8, since in the band raster memory 113 areas for two bands are prepared, the CPU 103 can draw a display list in one band while it transmits the other band to the engine.

As is described above, if the estimated time for drawing in a band is equal to or greater than the output time, data are drawn in all the bands in advance and are then output, so that the occurrence of a phenomenon where drawing does not catch up with output (an overrun) can be prevented.

The format of a display list and development of the display list in a raster memory will now be explained while referring to FIGS. 3 and 4.

Figure 3:
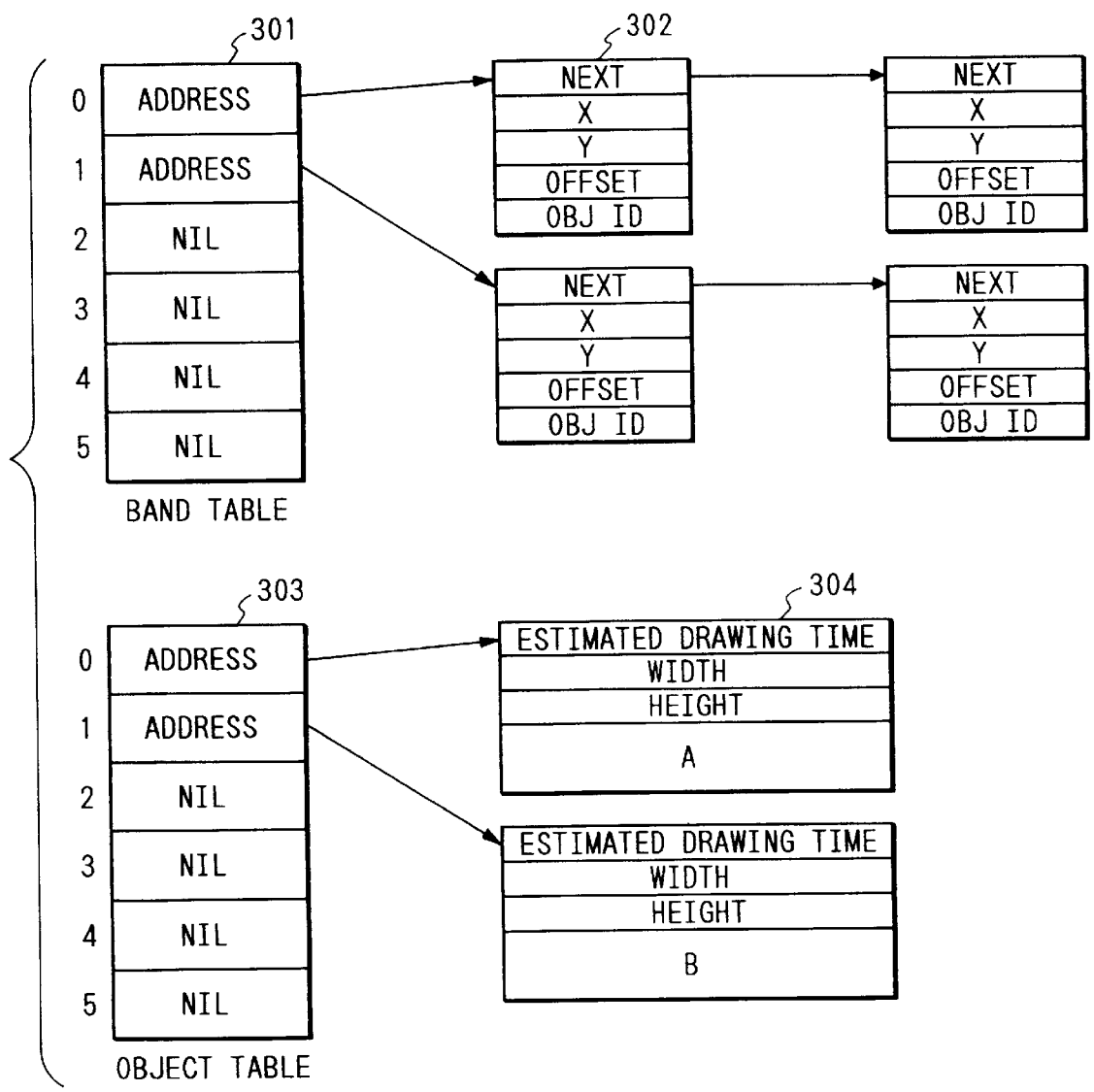
FIG. 3 is a diagram illustrating one example of a display list for the image processing apparatus of the embodiment.

FIG. 3 is a diagram showing one example of a display list that is employed by the image processing apparatus in this embodiment.

A band table 301 is used to divide a single page into a plurality of bands, and to manage objects that are to be drawn for each band. A drawing unit (application) 302 is employed for the management of print positions for those objects that are actually drawn. An object table 303 is employed for the management of drawing object data (for bit maps, graphics, or fonts in a ROM or a RAM) 304. The display list is a data list that consists of these elements 301 through 304.

In the band table 301 is an application link; in the application 302 is a pointer to the succeeding application, print positions X and Y in a band, an object number for the drawing object data 304, and a scan line offset from the head of the drawing object data 304 to a print start position in a band; in the object table 303 is a pointer to the drawing object data 304; and in the drawing object data 304 are the width and the height of the object and a drawing bit map. Sometimes, an estimated drawing time is included in the drawing object data 304.

Figure 4:
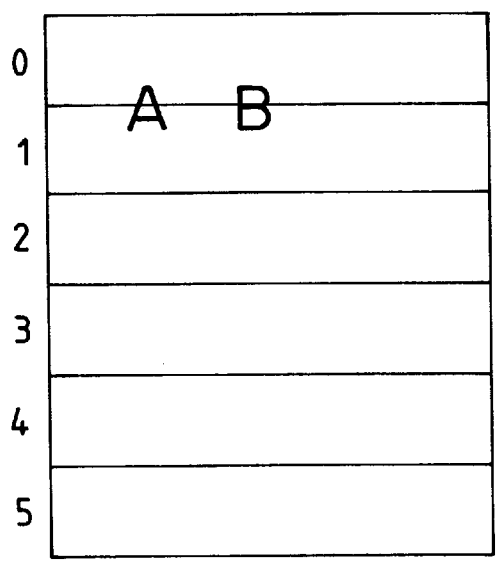
FIG. 4 is a specific diagram showing an example of the rasterization development of a display list in FIG. 3.

FIG. 4 is a specific diagram showing one example of rasterization development of the display list shown in FIG. 3.

As is shown in FIG. 4, the application is developed for each band, and rasterization is performed to draw the display list in the raster memory 103 and to effect an output.

An example image output unit with which the present invention can be employed will be explained before the structure of the present invention is described.

Figure 5:
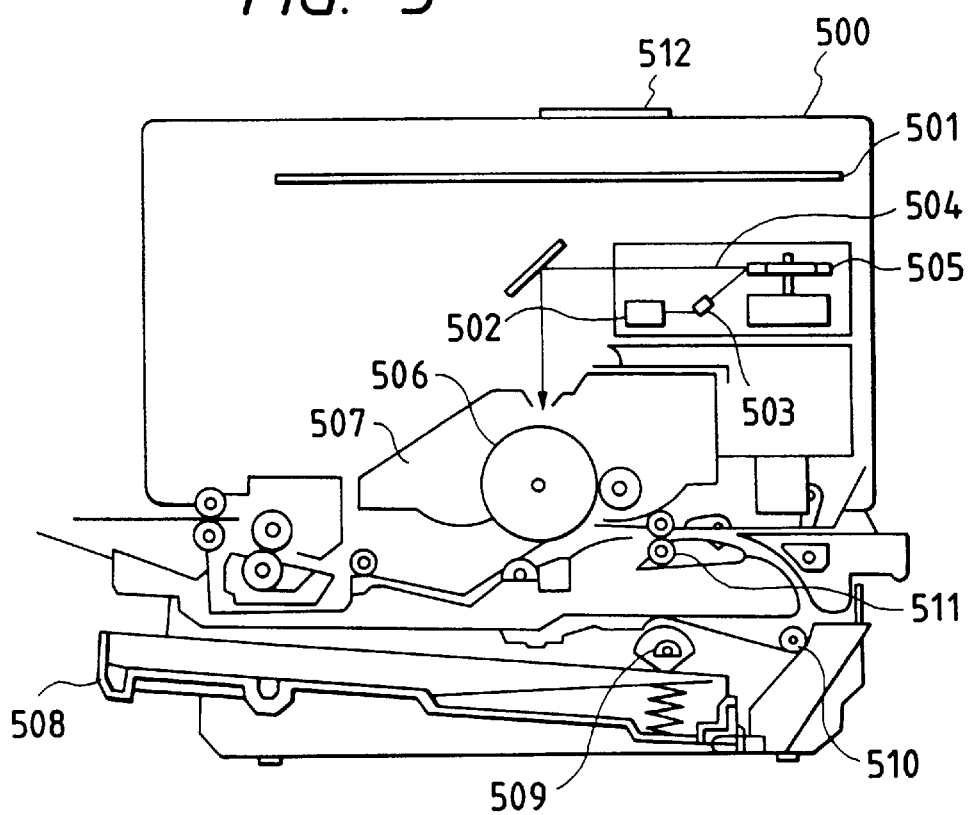
FIG. 5 is a cross sectional view of one example of an image output section with which the present invention can be employed.

FIG. 5 is a cross sectional view of an example image output unit with which the present invention can be employed, a laser beam printer.

An LBP main body 500 receives character data (character codes), form data, and macro commands from the externally connected host computer 101, and stores them. The LBP main body 500 also prepares corresponding character patterns and form patterns that are in consonance with the received data, and forms an image on a recording sheet, which is a recording medium. On a console panel 512 are provided operating switches and an LED display. A printer control unit 501 provides control for the entire LBP 500, and analyzes character data, etc., that are supplied by the host computer 101. The printer control unit 501 primarily converts the character data into video signals having corresponding character patterns, and outputs the signals to a laser driver 502.

In consonance with a received video signal, the laser driver 502, which is a circuit for driving a semiconductor laser 503, switches ON and OFF a laser beam 504 that is emitted by the semiconductor laser 503. The laser beam 504, which is reflected from side to side by a rotary multi-plane mirror 505, is employed to scan an electrostatic drum 506.

In this manner, an electrostatic latent image for a character pattern is formed on the electrostatic drum 506. This latent image is developed by a developing unit 507 that is located around the electrostatic drum 506, and the developed image is transferred to a recording sheet. Cut sheets are employed as the recording sheets, and are stored in a paper cassette 508 that is loaded into the main body 500. A cut sheet is fed toward the inside by a feeding roller 509 and by conveying rollers 510 and 511, and is supplied to the electrostatic drum 506.

Figure 6:
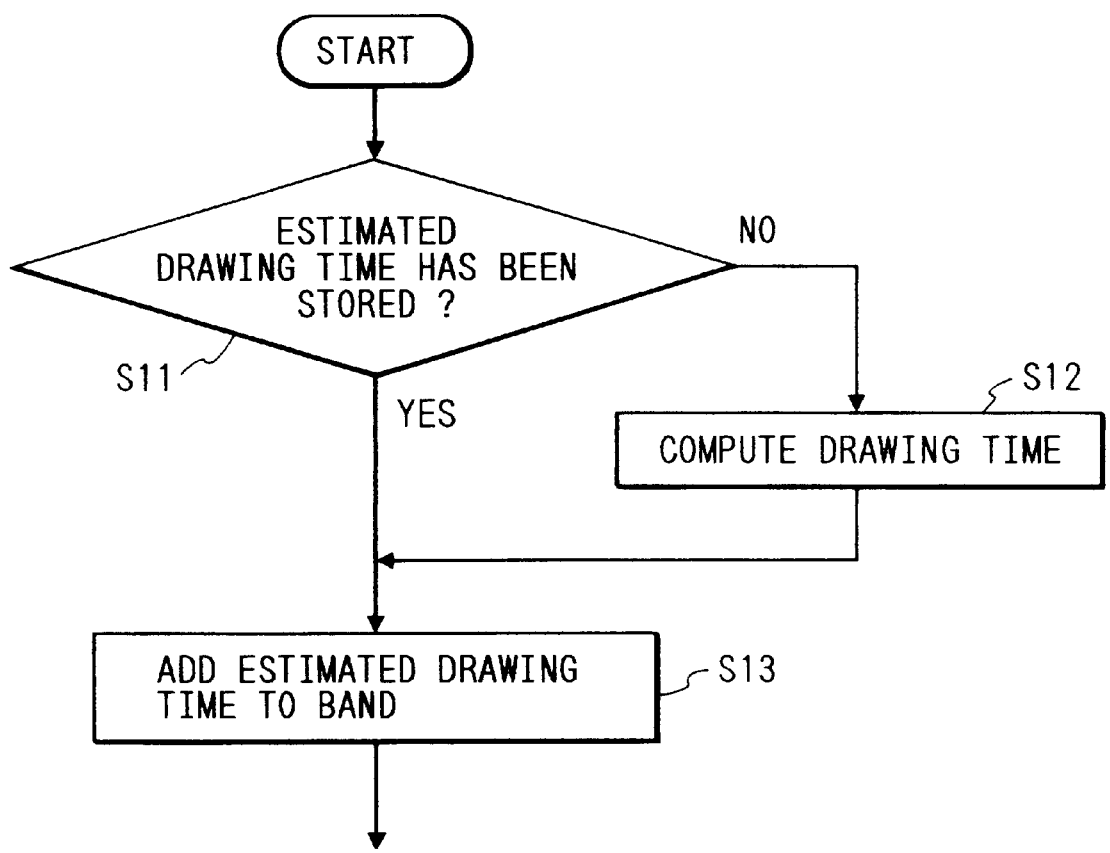
FIG. 6 is a flowchart showing one example of a drawing time addition process performed by a drawing time manager shown in FIG. 1.

FIG. 6 is a flowchart showing one example of a drawing time addition program that is performed by the drawing time manager 110 shown in FIG. 1. The labels S8 through S13 identify the individual processing steps.

Before the drawing time manager 110 estimates the time that is required for drawing a generated display list in the band raster memory 113, the CPU 103 determines whether or not an estimated drawing time has been stored in the display list (step S11). If the estimated drawing time has been stored, the stored time is added to a band (step S13).

If, at step S11, the estimated drawing time has not been stored, expression (1) or (2), which is described for the prior art, is employed to calculate the drawing time (step S12). Then, the drawing time is added to the band (step S13). Data that are stored in the display list for an object that is to be drawn may be data that are held in the ROM.

The processing for this embodiment will now be described while referring to FIGS. 3 and 6.

In a drawing method for an image processing apparatus which comprises a list generator (a function of the CPU 103) for generating, in response to a printer command received from a host computer, a display list that serves as intermediate code that printers use in common; a band drawing section (the band drawer 108) for drawing a raster image of the display list for each band width that is obtained by dividing a single page by a predetermined band count; a first storage section (the font ROM 106) in which in advance is stored an estimated drawing time that is required by the band drawing section to draw the raster image of the display list for each band; and a second storage section (the display list memory 112) in which are stored the display list, which is generated by the list generator, and the estimated drawing time that is read from the first storage section in consonance with the generated display list, a check is performed to determine whether or not the estimated drawing time for the display list has been stored in the second storage section before the band drawing section begins to draw a raster image for each band width (step S1 in FIG. 6); the estimated drawing time for the display list is added to calculate the drawing time (step S3 in FIG. 6); the drawing time that the band drawing section requires, for developing the display list into a raster image, is calculated by a predetermined arithmetic operation (step S2 in FIG. 6) when it is ascertained that the estimated drawing time has not been stored; and the acquired drawing time is compared with a predetermined permissible drawing time, which is set for each band, to obtain a different drawing area for the display list (steps S6 and S7 in FIG. 2). When the estimated drawing time is stored in the display list memory, the estimated drawing time is shortened while an appropriate drawing area is obtained quickly, so that program control can shift to and execute the following band drawing or page drawing process.

[Second Embodiment]

In the first embodiment, the drawing time manager 110 may compare the CPU type by which the drawing controller is operated with the CPU type for the estimated drawing time that is stored in the display list memory, and may calculate a drawing time in the above described manner only when the estimated drawing time is not stored in the display list memory.

[Third Embodiment]

In the first embodiment, the drawing time manager 110 may compare the CPU operation frequency at which the drawing controller is operated with the CPU operational frequency for the estimated drawing time that is stored in the display list memory, and may calculate the drawing time in the above described manner only when the estimated drawing time is not stored in the display list memory.

Further, the estimated drawing time in the environment where the drawing controller is activated may be calculated by using a ratio of the CPU operational frequency, at which the drawing controller is operated, to the CPU operational frequency for the estimated drawing time that is stored in the display list memory, and the estimated drawing time that is stored in the display list memory.

[Fourth Embodiment]

In the first embodiment, the drawing time manager 110 may determine the presence of a drawing accelerator for the drawing controller and the presence of a drawing accelerator for the estimated drawing time, which is stored in the display list memory, and may calculate the drawing time in the above described manner only when the estimated drawing time is not stored in the display list memory.

[Fifth Embodiment]

In the first embodiment, fonts, etc., for which the drawing time can be calculated in advance, may be separated into groups in consonance with their drawing times, and a group ID for the font and the drawing time of each group may be stored in the font memory. Further, the drawing time manager 110 may calculate an estimated drawing time by referring to the drawing time for the font by using the group ID for the font.

[Sixth Embodiment]

For fonts, etc., for which the drawing time can be calculated and which are compressed, the drawing controller may store their decompression times in the font memory, and the drawing time manager 110 may add the font decompression time to the drawing time for the font to acquire an estimated drawing time.

[Seventh Embodiment]

In addition, for fonts, etc., for which the drawing time can be calculated and which are compressed, the drawing controller may store in the font memory data that are required for the calculation of font decompression times, and the drawing time manager 110 may calculate the decompression time by using the calculation data and may add it to the drawing time to acquire an estimated drawing time.

When, for example, a font is compressed for a G3 facsimile, the number of inversions from white space to black space in an object is stored as decompression estimate data, and the estimated drawing time T can be represented by expression (3):

$$T = a + b \cdot wd + c \cdot ht + d \cdot S \tag{3}$$

(a, b, c and d are constants), wherein wd denotes the width of a character after decompression, ht denotes the height of the character after decompression, and S denotes an inversion count.

The inversion count is the number of changes from white space to black space or from black space to white space for each scan line when an image is scanned from the upper left to the lower right.

[Eighth Embodiment]

For data, such as fonts, that are to be compressed during the drawing control process and are to be decompressed before the actual drawing, before the compression the drawing controller may estimate the decompression time for the font, and the drawing time manager 110 may add the font decompression time to the drawing time of the font to acquire the estimated drawing time.

More specifically, before data that are input to the input buffer 102 in FIG. 1 are to be compressed by the program ROM 104, the decompression time for the data is estimated. The compressed data are then included in the drawing object data 304 in the display list 112. The drawing time manager 110 acquires an estimated drawing time by adding the decompression time to the drawing time.

When the font is compressed for the G3 facsimile, the inversion count for white spaces and for black spaces in an object is employed as decompression estimate data to acquire the estimated drawing time T from expression (3). The estimated time T is thereafter stored.

Although the decompression time is stored in the font ROM in the sixth embodiment (i.e., the calculation of the decompression time is performed when the ROM is prepared), the decompression time for an object that is prepared and compressed during the drawing control process may be estimated before compression.

Although in the above embodiments a laser beam printer is employed as an example image output unit 105 for which the present invention may be applied, the present invention can be applied for a different type of printer, such as an ink jet printer.

In addition, the present invention can be applied for a system that is constituted by a plurality of devices or for an apparatus that consists of a single device. The present invention can also be applied when, to achieve the object of the invention, a program is supplied to a system or an apparatus.

The processing of the individual embodiments will now be described while referring to FIGS. 1 through 4.

Provided are a list generator (a function of the CPU 103) for generating, in response to a printer command received from a host computer, a display list that serves as intermediate code that printers use in common; a band drawing section (the band drawer 108) for drawing a raster image of the display list for each band width that is obtained by dividing a single page by a predetermined band count; a first storage section (provided in the font ROM 106 in the embodiments) in which is stored, in advance, an estimated drawing time that the band drawer requires for drawing the raster image of the display list for each band; a second storage section (the display list memory 112 in the RAM 107) in which are stored the display list, which is generated by the list generator, and the estimated drawing time that is read from the first storage section in consonance with the generated display list; a determiner (a function of the CPU 103) for determining, before the band drawer begins to draw a raster image for each band, whether or not the estimated drawing time for the display list is stored in the second storage section; and a first drawing time calculation section (the drawing time manager 110) for acquiring, when the determiner determines that the estimated drawing time is stored, a drawing time by the addition of the estimated drawing time for the display list. With this arrangement, before the band drawer 108 begins to draw a raster image for each band, the CPU 103 reads the estimated drawing time for the display list from the font ROM 106. When the CPU 103 determines that the estimated drawing time is stored in the display list memory 112, the drawing time manager 110 simply performs the addition of the estimated drawing time for the display list and acquires a drawing time. When the display list is generated, the estimated drawing time can be fetched from the font ROM 106 without depending on computation, so that the time required for the calculation of the estimated drawing time for the display list can be reduced.

Further, also provided are the drawing time manager 110, for performing, when the determiner (the CPU 103) ascertains that the estimated drawing time is not stored, a predetermined calculation to acquire a drawing time during which the band drawer 108 develops the display list into a raster image; and a drawing controller (a function of the CPU 103), for comparing the drawing time obtained by the first, or the second, drawing time calculation section (drawing time manager 110) with a predetermined permissible drawing time, which is set for each band, in order to control band drawing or page drawing relative to the display list. With this arrangement, when the CPU 103 determines that the estimated drawing time is not stored, the drawing time manager 110 performs the predetermined calculation and acquires the drawing time that the band drawer 108 requires for developing the display list into a raster image. The drawing time obtained by the drawing time manager 110 is compared with the predetermined permissible drawing time that is set for each band, and the CPU 103 controls band drawing or page drawing relative to the display list. When the stored or obtained estimated drawing time is within the predetermined permissible drawing time, band drawing of the display list is performed. When the estimated drawing time exceeds the predetermined permissible time, page drawing of the display list is performed. When the estimated drawing time is held in the display list memory, the estimated drawing time is reduced, while program control can be shifted to the following band drawing or page drawing process.

An estimated drawing time for a display list is stored in the first storage section (the font ROM 106 in the embodiments), in consonance with the type of drawing process for the band drawer 108, so that the appropriate estimated drawing time that is consonant with type of the drawing process for the band drawer 108 can be acquired within a short time without depending on computation.

In addition, in consonance with the drawing process speed of the band drawer 108 (processing speed of the CPU 103), an estimated drawing time for a display list is separately stored in the first storage section (the font ROM 106 in the embodiments), so that the appropriate estimated drawing time that is consonant with the drawing process speed of the band drawer 108 can be acquired within a short time without depending on computation.

Further provided is a band drawing accelerator for the fast drawing of a raster image of a display list for each band, which is obtained by dividing a single page by a specified band count (e.g., a dedicated accelerator board for drawing (not shown), such as an accelerator board for postscript type 2, that is inserted into a control slot of the CPU (not shown) 103 so that the CPU 103 can determine the presence of the accelerator). An estimated drawing time for a display list is separately stored in the first storage section in consonance with the presence of the band drawing accelerator. When the band drawing accelerator is present, an estimated drawing time that is appropriate for the band drawing accelerator can be calculated in a short time without depending on computation.

Further, in the first storage section (the font ROM 106 in the embodiments) are stored group identification data for groups that are consonant with an estimated drawing time for character font information, and estimated drawing times for the individual group identification data. Even when the estimated drawing time varies in consonance with the complexity of characters, an estimated drawing time does not have to be stored for individual characters; the estimated drawing time that is assigned to the group identification data is employed to roughly calculate, within a short time and without depending on computation, an estimated drawing time for each character.

Moreover, in the first storage section (the font ROM 106 in the embodiments) are stored decompression time data for acquiring an estimated drawing time for compressed character font data. An estimated drawing time required for decompressing and drawing the compressed character data can be properly acquired in a short time, within a permissible error range, and without depending on computation.

Also, in the first storage section (the font ROM 106 in the embodiments) are stored decompression time calculation data for acquiring an estimated drawing time for compressed character font data. An estimated drawing time required for decompressing and drawing the compressed character data can be properly acquired in a short time, within a permissible error range, and without depending on computation.

Further, a first storage section is provided in the font memory section (font ROM 106), so that an estimated drawing time for a character that can be output can be calculated in a short time.

When character font data are to be compressed during the band drawing control process or the page drawing control process, and when the compressed character font data are to be decompressed before the band drawing or the page drawing is begun, the drawing controller (a function of the CPU 103) estimates the decompression time for the character font data at the time of compression. The first drawing time calculation section acquires an estimated drawing time for the character font data by the addition of the estimated decompression time. Therefore, an appropriate estimated drawing time, which is required for decompressing and drawing the character data that were compressed during the drawing control process, can be acquired in a short time and within a permissible error range.

In the above embodiments, various data that are described above, concerning an estimated drawing time for each character that is stored in the font ROM 106, are stored in advance. However, in an image processing apparatus that can store data on an external memory medium, such as a memory card, various data for the estimated drawing time may be stored on the external memory medium, so that when a display list is to be generated, the data may be read from the external memory medium and the same effect can be provided. If the estimated drawing time is stored on the memory card for each typeface (a cursive style typeface, a textbook style typeface, etc.), an appropriate estimated drawing time for each typeface can be acquired in a short time.

The above memory medium may be a hard disk (HD), a magneto-optical disk, or the like.

As is described above, according to one of the embodiments, before the band drawer begins to draw a raster image of a display list for each band width, the determiner ascertains whether or not an estimated drawing time for the display list has been read from the first storage section and is stored in the second storage section. When the determiner finds that the estimated drawing time is stored in the second storage section, the first drawing time calculation section provides a drawing time by the addition of the estimated drawing time for the display list. In this manner, when a display list is to be generated, the estimated drawing time can be fetched from the first storage section without performing complicated computations, so that the time required for the calculation of the estimated drawing time for the display list can be reduced.

According to another one of the embodiments, when the determiner ascertains that an estimated drawing time is not stored, the second drawing time calculation section performs a predetermined calculation to acquire a drawing time that the band drawer requires for developing the display list into a raster image. The drawing time that is acquired by the first or the second drawing time calculation section is compared with a predetermined permissible drawing time that is set for each band, and in consonance with the result, the drawing controller controls the band drawing or the page drawing relative to the display list. When the stored or obtained estimated drawing time is within the predetermined permissible drawing time, band drawing of the display list is performed. When the estimated drawing time exceeds the predetermined permissible drawing time, page drawing of the display list is performed. When the estimated drawing time is held in the display list memory, the estimated drawing time is shortened, while program control can be shifted to the following band drawing or page drawing process.

According to an additional one of the embodiments, an estimated drawing time for a display list is stored in the first storage section in consonance with the type of drawing process employed by the band drawer, so that the appropriate estimated drawing time that is consonant with the type of drawing process employed by the band drawer can be acquired within a short time without depending on computation.

According to a further one of the embodiments, in consonance with the drawing process speed of the band drawer, an estimated drawing time for a display list is separately stored in the first storage section, so that the appropriate estimated drawing time that is consonant with the drawing process speed of the band drawer can be acquired within a short time without depending on computation.

According to still another one of the embodiments, since an estimated drawing time for a display list is separately stored in the first storage section in consonance with the presence of the band drawing accelerator, when the band drawing accelerator is present an estimated drawing time appropriate for the band drawing accelerator can be calculated in a short time without depending on computation.

According to a still further one of the embodiments, in the first storage section are stored group identification data for groups that are consonant with the length of an estimated drawing time for character font information, and estimated drawing times for the individual group identification data. Even when the estimated drawing time varies in consonance with the complexity of characters, the estimated drawing time does not have to be stored for individual characters; the estimated drawing time that is assigned to the group identification data is employed to roughly calculate, within a short time and without depending on computation, an estimated drawing time for drawing each character.

According to yet another one of the embodiments, in the first storage section is stored decompression time data for acquiring an estimated drawing time for compressed character font data, so that an estimated drawing time required for decompressing and drawing the compressed character data can be properly acquired in a short time, within a permissible error range, and without depending on computation.

According to yet an additional one of the embodiments, in the first storage section is stored decompression time calculation data for acquiring an estimated drawing time for compressed character font data, so that an estimated drawing time required for decompressing and drawing the compressed character data can be properly acquired in a short time, within a permissible error range, and without depending on computation.

According to yet a further one of the embodiments, since a first storage section is provided in the font memory section, an estimated drawing time for a character that can be output can be calculated in a short time.

According to one more of the embodiments, when character font data are to be compressed during the band drawing control process or the page drawing control process, and when the compressed character font data are to be decompressed before the band drawing or the page drawing is begun, the drawing controller estimates the decompression time for the character font data at the time of compression. The first drawing time calculation section acquires an estimated drawing time for the character font data by the addition of the estimated decompression time. Therefore, an appropriate estimated drawing time, which is required for decompressing and drawing the character data that were compressed during the drawing control process, can be acquired in a short time and within a permissible error range.

According to still one more of the embodiments, a check is performed to determine whether or not the estimated drawing time for the display list is stored in the second storage section before the band drawer begins to draw a raster image for each band width. When it is ascertained that the estimated drawing time has been stored, the estimated drawing time for the display list is added to calculate the drawing time. When it is ascertained that the estimated drawing time has not been stored, the drawing time that the band drawer requires for developing the display list into a raster image is calculated by a predetermined arithmetic operation. The acquired drawing time is compared with a predetermined permissible drawing time, which is set for each band, to obtain a different drawing area for the display list. Therefore, so long as the estimated drawing time is stored in the display list memory, the estimated drawing time can be reduced while an appropriate drawing area can be quickly acquired, and program control can be shifted for the execution of the following band drawing or page drawing process.

Thus, an estimated drawing time required for drawing a display list can be acquired more easily and rapidly than in a conventional case. Also, an estimated drawing time for a compressed object that is to be drawn can be obtained with a smaller error than in a conventional case.

What is claimed is:

1. An image processing apparatus comprising:

list generation means for generating, in consonance with a printer command input by a host commuter, a display list that serves as intermediate code that printers use in common;

derivation means for, upon compressing intermediate code included in the display list, deriving calculation information for use in calculating a decompression time of the intermediate code;

storage means for storing, in advance of each object in the display list, an estimated drawing time required for the object when drawing a raster image of the display list and the calculation information derived by said derivation means; and calculation means for calculating a drawing time of the raster image by addition of the estimated drawing time stored in said storage means and the decompression time of the intermediate code obtained from the calculation information stored in said storage means, prior to a drawing operation of the raster image.

2. An image processing apparatus according to claim 1, further comprising computation means for, when said estimated drawing time is not stored in said storage means, performing a predetermined arithmetic operation to acquire a drawing time required for developing said display list into a raster image.

3. An image processing apparatus according to claim 1, further comprising drawing control means for performing a comparison of said drawing time with a predetermined permissible drawing time set for each band, and for controlling, in consonance with a result of said comparison, band drawing or page drawing for said display list.

4. An image processing apparatus according to claim 1, wherein said storage means separately stores said estimated drawing time for said display list in consonance with a type of drawing process employed by band drawing means.

5. An image processing apparatus according to claim 1, wherein said storage means separately stores said estimated drawing time for said display list in consonance with a drawing process speed of said band drawing means.

6. An image processing apparatus according to claim 1, further comprising band drawing acceleration means for drawing at high speed a raster image of said display list for each band width.

7. An image processing apparatus according to claim 1, wherein said storage means separately stores said estimated drawing time for said display list in consonance with whether or not said band drawing acceleration means is present.

8. An image processing apparatus according to claim 1, wherein said storage means stores identification data for groups that are consonant with an estimated drawing time for character font data, and the estimated drawing time for each of the groups.

9. An image processing apparatus according to claim 1, wherein said storage means is provided in a font memory means for storing said character font data.

10. An image processing method comprising the steps of:

generating, in consonance with a printer command input by a host computer, a display list that serves as intermediate code that printers use in common;

deriving, upon compressing intermediate code included in the display list, calculation information for use in calculating a decompression time of the intermediate code;

storing, in advance for each object in the display list, an estimated drawing time required for the object when drawing a raster image of the display list and the calculation information derived in said deriving step; and calculating a drawing time of the raster image by addition of the estimated drawing time stored in said storing step and the decompression time of the intermediate code obtained from the calculation information stored in said storing step, prior to a drawing operation of the raster image.

11. An image processing method according to claim 10, further comprising the step of, when the estimated drawing time is not stored in said storage step, performing a predetermined arithmetic operation to acquire a drawing time required for developing the display list into a raster image.

12. An image processing method according to claim 10, further comprising the step of performing a comparison of the drawing time with a predetermined permissible drawing time set for each band, and of controlling, in consonance with a result of the comparison, band drawing or page drawing for the display list.

13. An image processing method according to claim 10, wherein in said storage step the estimated drawing time for the display list is separately stored in consonance with a type of drawing process.

14. An image processing method according to claim 10, wherein in said storage step the estimated drawing time for the display list is separately stored in consonance with a drawing process speed.

15. An image processing method according to claim 10, further comprising the step of drawing at high speed a raster image of the display list for each band width.

16. An image processing method according to claim 10, wherein in said storage step the estimated drawing time for the display list is separately stored in consonance with whether or not a band drawing acceleration means is present.

17. An image processing method according to claim 10, wherein in said storage step are stored identification data for groups that are consonant with an estimated drawing time for character font data, and the estimated drawing time for each of the groups.

18. An image processing method according to claim 10, wherein said storage step is performed by a font memory means for storing the character font data.

19. A memory medium used in an image processing apparatus, said memory medium comprising memory means for storing a program comprising the processes for:

generating, in consonance with a printer command input by a host computer, a display list which serves as intermediate code that printers use in common;

deriving, upon compressing intermediate code included in the display list, calculation information for use in calculating a decompression time of the intermediate code;

storing, in advance for each object in the display list, an estimated drawing time required for the object when drawing a raster image of the display list and the calculation information derived in said deriving process; and calculating a drawing time of the raster image by addition of the estimated drawing time stored in said storing process and the decompression time of the intermediate code obtained from the calculation information stored in said storing process, prior to a drawing operation of the raster image.

20. A memory medium according to claim 19, wherein said program further comprises the process for performing, when the estimated drawing time is not stored in the memory, a predetermined computation to acquire a drawing time required for developing the display image into a raster image.

21. A memory medium according to claim 19, wherein said program further comprises the process for comparing the drawing time with a predetermined permissible drawing time that is set for each band, and for controlling band drawing or page drawing for the display list.

22. A memory medium according to claim 19, wherein, in said storage process, the estimated drawing time corresponding to the display list is stored in consonance with a type of drawing process.

23. A memory medium according to claim 19, wherein, in said storage process, the estimated drawing time corresponding to the display list is stored in consonance with a drawing process speed.

24. A memory medium according to claim 19, wherein said program further comprises the process for drawing at high speed a raster image of the display list for each band width.

25. A memory medium according to claim 19, wherein, in said storage process, the estimated drawing time for the display list is separately stored in consonance with whether or not a means for drawing the raster image at high speed is present.

26. A memory medium according to claim 19, wherein in said storage process are stored identification data for groups that are consonant with an estimated drawing time for character font data, and the estimated drawing time for each of the groups.

27. A memory medium according to claim 19, wherein said storage process is performed in a font memory means for storing the character font data.

28. An image processing apparatus comprising:

list generation means for generating a display list that serves as intermediate code for use by printers in common, in consonance with a printer command input by a host computer;

derivation means for deriving calculation information, upon compression of intermediate code included in the display list, for use in calculating a decompression time of the intermediate code;

storage means for storing, in advance for each object in the display list, the calculation information derived by said derivation means; and calculation means for calculating a drawing time of a raster image of the display list based on an estimated drawing time required for the object when drawing the raster image and the decompression time of the intermediate code obtained from the calculation information stored in said storage means, prior to a drawing operation of the raster image for each band.

29. An apparatus according to claim 28, wherein said calculation means calculates the estimated drawing time required for drawing the raster image on a band for each display list and adds the estimated drawing time to a band management table, thereby calculating the drawing time required for drawing the raster image of all display lists to be drawn on the band.

30. An apparatus according to claim 29, further comprising drawing control means for comparing the drawing time with a permissible drawing time predetermined for each band, and, in response to a comparison result, controlling a band drawing process of drawing the raster image from the display list.

31. An apparatus according to claim 30, further comprising print means for printing the raster image drawn by said drawing control means.

32. An apparatus according to claim 28, wherein the calculation information derived by said derivation means is included in the display list for each object.

33. An apparatus according to claim 29, wherein the calculation information derived by said derivation means is stored in a font ROM.

34. An image processing method, comprising the steps of:

generating a display list that serves as intermediate code for use by printers in common, in consonance with a printer command input by a host computer;

deriving calculation information, upon compression of intermediate code included in the display list, for use in calculating a decompression time of the intermediate code;

storing, in advance for each object in the display list, the calculation information derived in said deriving step; and calculating a drawing time of a raster image of the display list based on an estimated drawing time required for the object when drawing the raster image and the decompression time of the intermediate code obtained from the calculation information stored in said storage means, prior to a drawing operation of the raster image for each band.

35. A method according to claim 34, wherein said calculating step includes calculating the estimated drawing time required for drawing the raster image on a band for each display list and adding the estimated drawing time to a band management table, thereby calculating the drawing time required for drawing the raster image of all display lists to be drawn on the band.

36. A method according to claim 35, further comprising the steps of:

comparing the drawing time with a permissible drawing time predetermined for each band; and controlling a band drawing process of drawing the raster image from the display list, in response to a comparison result obtained in said comparing step.

37. A method according to claim 36, further comprising a step of printing the raster image drawn in said controlling step.

38. A method according to claim 34, wherein the calculation information derived in said deriving step is included in the display list for each object.

39. A method according to claim 35, wherein the calculation information derived in said deriving step is stored in a font ROM.

40. A memory medium in which is stored computer readable code to be executed by a computer, said computer readable code comprising the steps of:

generating a display list that serves as intermediate code for use by printers in common, in consonance with a printer command input by a host computer;

deriving calculation information, upon compression of intermediate code included in the display list, for use in calculating a decompression time of the intermediate code;

storing, in advance for each object in the display list, the calculation information derived in said deriving step; and calculating a drawing time of a raster image of the display list based on an estimated drawing time required for the object when drawing the raster image and the decompression time of the intermediate code obtained from the calculation information stored in said storage means, prior to a drawing operation of the raster image for each band.

41. A memory medium according to claim 40, wherein said calculating step includes calculating the estimated drawing time required for drawing the raster image on a band for each display list and adding the estimated drawing time to a band management table, thereby calculating the drawing time required for drawing the raster image of all display lists to be drawn on the band.

42. A memory medium according to claim 41, further comprising the steps of:

comparing the drawing time with a permissible drawing time predetermined for each band; and controlling a band drawing process of drawing the raster image from the display list, in response to a comparison result obtained in said comparing step.

43. A memory medium according to claim 42, further comprising a step of printing the raster image drawn in said controlling step.

44. A memory medium according to claim 40, wherein the calculation information derived in said deriving step is included in the display list for each object.

45. A memory medium according to claim 41, wherein the calculation information derived in said deriving step is stored in a font ROM.

* * * * *

UNITED STATES PATENT AND TRADEMARK OFFICE
CERTIFICATE OF CORRECTION

PATENT NO. : 5,982,391

DATED : November 9, 1999

INVENTOR(S) : Joji OKI

It is certified that error appears in the above-identified patent and that said Letters Patent is hereby corrected as shown below:

<u>COLUMN 1</u>

Line 54,
"a+b·wd+c·ht+d/S1" should read --T = a+b·wd+c·ht+d/S1--.

Signed and Sealed this

Fifth Day of September, 2000

Attest:

Attesting Officer

Q. TODD DICKINSON

Director of Patents and Trademarks